(12) United States Patent
Ings et al.

(10) Patent No.: US 10,354,213 B1
(45) Date of Patent: Jul. 16, 2019

(54) NATURAL EXPERIMENT FINDER SYSTEM AND METHOD

(71) Applicant: APPLIED PREDICTIVE TECHNOLOGIES, INC., Arlington, VA (US)

(72) Inventors: Scott Ings, Arlington, VA (US); Evan Rosenman, Warren, NJ (US); Aaron Silverman, Washington, DC (US); Vrushali Paunikar, San Francisco, CA (US); Alan Li, Ashburn, VA (US); Mark D'Agostino, Washington, DC (US); Andrew Crewson, Arlington, VA (US); Michael Monteiro, Menlo Park, CA (US)

(73) Assignee: Applied Predictive Technologies, Inc., Arlington, VA (US)

(*) Notice: Subject to any disclaimer, the term of this patent is extended or adjusted under 35 U.S.C. 154(b) by 0 days.

(21) Appl. No.: 14/286,257

(22) Filed: May 23, 2014

Related U.S. Application Data

(63) Continuation-in-part of application No. 13/337,498, filed on Dec. 27, 2011.

(51) Int. Cl.
   G06Q 10/06 (2012.01)
(52) U.S. Cl.
   CPC ..... *G06Q 10/06375* (2013.01); *G06Q 10/067* (2013.01)
(58) Field of Classification Search
   CPC ................................ G06Q 10/00; G06Q 30/02
   USPC .................................................. 705/7.11–7.42
   See application file for complete search history.

(56) References Cited

U.S. PATENT DOCUMENTS

| 7,512,623 | B2 * | 3/2009 | Apps et al. | |
| 8,224,686 | B1 * | 7/2012 | Bruce et al. | 705/7.29 |
| 8,571,916 | B1 * | 10/2013 | Bruce et al. | 705/7.28 |
| 8,583,695 | B2 * | 11/2013 | Espejel et al. | 707/798 |
| 2009/0012848 | A1 * | 1/2009 | Brooks et al. | 705/10 |
| 2010/0017288 | A1 * | 1/2010 | Graham et al. | 705/14.45 |

OTHER PUBLICATIONS

Ayres, Chapter 2: Creating Your Own Data with the Flip of a Coin, Super Crunchers: Why Thinking-by-Numbers Is the New Way to Be Smart, 2007, Bantam, New York, p. 46-63.

(Continued)

*Primary Examiner* — Robert D Rines
(74) *Attorney, Agent, or Firm* — Eric L. Sophir; Dentons US LLP

(57) ABSTRACT

The methods and systems described herein attempt to address the above-mentioned need by providing an algorithm and software capability to automatically detect and assess "natural experiments" that exist in any underlying dataset. In one embodiment, a computer-implemented method for identifying an experiment to use in an analysis of a business initiative comprises storing, by a computer, a set of historical data regarding entities in a business network; receiving, by the computer, a selection of inputs for the historical data; detecting, by the computer, a natural experiment based upon changes in the historical data; and outputting, by the computer, a report of a detected experiment from the historical data.

23 Claims, 16 Drawing Sheets

(56) References Cited

OTHER PUBLICATIONS

Anderson et al., A Step-by-Step Guide to Smart Business Experiments, Harvard Business Review, Mar. 2011, downloaded from http://hbr.org/2011/03/a-step-by-step-guide-to-smart-business-experiments/ar/1 on Dec. 8, 2011, 7 pages.

Brody, Sorting Through the Confusion Over Estrogen, The New York Times, 2002, downloaded from http://www.nytimes.com/2002/09/03/science/sorting-through-the-confusion-over-estrogen.html?pagewanted=all on Dec. 8, 2011, 5 pages.

Davenport, How to Design Smart Business Experiments, Harvard Business Review, Feb. 2009, downloaded from http://hbr.org/2009/02/how-to-design-smart-business-experiments/ar/1 on Dec. 8, 2011, 8 pages.

Marketing Mix Modeling, Wikipedia, downloaded from http://en.wikipedia.org/wiki/Marketing_mix_modeling on Dec. 8, 2011, 8 pages.

McCann, Big Retailers Put Testing to the Test, News and Insight for Financial Executives, CFO, 2010, downloaded from http://www.cfo.com/article.cfm/14538026?f=singlepage on Dec. 8, 2011, 2 pages.

Natural Experiment, Wikipedia, the Free Encyclopedia, downloaded from http://en.wikipedia.org/wiki/Natural_experiment on Dec. 8, 2011, 3 pages.

Pearlstein, In Studying Behavior, Scientific Testing Has Advantages—and Limits, The Washington Post: National, World & D.C. Area News and Headlines, 2010, downloaded from http://www.washingtonpost.com/wp-dyn/content/article/2010/08/03/AR2010080306820.html on Dec. 8, 2011, 3 pages.

Rosenzweig et al., Natural "Natural Experiments" in Economics, Journal of Economic Literature, 2000, pp. 827-874, vol. XXXVIII.

Ryan, How to Know What Media Are Working, IMedia Connection, 2006, downloaded from http://www.imediaconnection.com/content/11502.asp on Dec. 8, 2011.

Stedman, 'Natural Experiment' Documents the Population Benefit of Vaccinating Preschoolers against the Flu, EurekAlert!, Sep. 2011, downloaded from, http://www.eurekalert.org/pub_releases/2011-09/chb-ed091511.php on Dec. 8, 2011, 2 pages.

The Future of Advertising: Implications for Marketing and Media, Booz | Allen | Hamilton, 2006, downloaded from http://www.boozallen.com/media/file/153550.pdf on Dec. 8, 2011, 9 pages.

* cited by examiner

| Store | Product Price | | | | |
|---|---|---|---|---|---|
| | 1/1/2013 | 1/8/2013 | 1/15/2013 | 1/22/2013 | 1/29/2013 | 2/5/2013 |
| Store A | $100 | $100 | $100 | $120 | $120 | $100 |
| Store B | $100 | $100 | $100 | $110 | $110 | $110 |
| Store C | $100 | $100 | $100 | $100 | $120 | $120 |
| Store D | $100 | $100 | $100 | $100 | $100 | $100 |
| Store E | $100 | $100 | $100 | $100 | $100 | $90 |
| Store F | $70 | $80 | $80 | $80 | $80 | $80 |

*Fig. 3*

| Date | Store ID | Category ID | Metric Value (e.g. Price) |
|---|---|---|---|
| 1/1/13 | 1 (Store A) | 25 (Product X) | $100 |

| Sequence | Store ID | Category ID | Metric Value (e.g. Price) |
|---|---|---|---|
| 1 | Store A | Product X | 100 |
| 2 | Store A | Product X | 100 |
| 3 | Store A | Product X | 100 |
| 4 | Store A | Product X | 120 |
| 5 | Store A | Product X | 120 |
| 6 | Store A | Product X | 100 |
| 1 | Store B | Product X | 100 |
| 2 | Store B | Product X | 100 |
| 3 | Store B | Product X | 100 |
| 4 | Store B | Product X | 110 |
| 5 | Store B | Product X | 110 |
| 6 | Store B | Product X | 110 |
| 1 | Store C | Product X | 100 |
| 2 | Store C | Product X | 100 |
| 3 | Store C | Product X | 100 |
| 4 | Store C | Product X | 120 |
| 5 | Store C | Product X | 120 |
| 6 | Store C | Product X | 100 |
| 1 | Store D | Product X | 100 |
| 2 | Store D | Product X | 100 |
| 3 | Store D | Product X | 100 |
| 4 | Store D | Product X | 100 |
| 5 | Store D | Product X | 100 |
| 6 | Store D | Product X | 100 |
| 1 | Store E | Product X | 100 |
| 2 | Store E | Product X | 100 |
| 3 | Store E | Product X | 100 |
| 4 | Store E | Product X | 100 |
| 5 | Store E | Product X | 90 |
| 6 | Store E | Product X | 70 |
| 1 | Store F | Product X | 80 |
| 2 | Store F | Product X | 80 |
| 3 | Store F | Product X | 80 |
| 4 | Store F | Product X | 80 |
| 5 | Store F | Product X | 80 |
| 6 | Store F | Product X | 80 |

| Potential Experiment ID | Event Sequence | Store ID | Category ID | Pre Value | Post Value |
|---|---|---|---|---|---|
| 1 | 4 | A | X | $100 | $120 |
| 2 | 6 | A | X | $120 | $100 |
| 3 | 4 | B | X | $100 | $110 |
| 4 | 5 | C | X | $100 | $120 |
| 5 | 6 | E | X | $100 | $90 |
| 6 | 2 | F | X | $70 | $80 |

*FIG. 9*

| Potential Experiment ID | Pre Period Length | Post Period Length |
|---|---|---|
| 1 | 3 | 2 |
| 2 | 2 | 1 |
| 3 | 3 | 3 |
| 4 | 4 | 2 |
| 5 | 5 | 1 |
| 6 | 1 | 5 |

*FIG. 10*

| Event Sequence | Potential Control Store |
|---|---|
| 2 | A |
| 2 | B |
| 2 | C |
| 2 | D |
| 2 | E |
| 4 | C |
| 4 | D |
| 4 | E |
| 4 | F |
| 5 | A |
| 5 | B |
| 5 | D |
| 5 | E |
| 5 | F |
| 6 | B |
| 6 | C |
| 6 | D |
| 6 | F |

*FIG. 11*

| Event Sequence | Potential Control Store | Pre Period Length | Post Period Length |
|---|---|---|---|
| 2 | A | 1 | 2 |
| 2 | B | 1 | 2 |
| 2 | C | 1 | 3 |
| 2 | D | 1 | 5 |
| 2 | E | 1 | 4 |
| 4 | C | 3 | 1 |
| 4 | D | 3 | 3 |
| 4 | E | 3 | 2 |
| 4 | F | 2 | 3 |
| 5 | A | 1 | 1 |
| 5 | B | 1 | 2 |
| 5 | D | 4 | 2 |
| 5 | E | 4 | 1 |
| 5 | F | 3 | 2 |
| 6 | B | 2 | 1 |
| 6 | C | 1 | 1 |
| 6 | D | 5 | 1 |
| 6 | F | 4 | 1 |

FIG. 12

| Potential Experiment ID | Potential Pre Period Length | Potential Post Period Length |
|---|---|---|
| 1 | 2 | 1 |
| 1 | 2 | 2 |
| 1 | 3 | 1 |
| 1 | 3 | 2 |

FIG. 13

| Potential Experiment ID | Potential Pre Period Length | Potential Post Period Length | Number of Control |
|---|---|---|---|
| 1 | 2 | 1 | 4 |
| 1 | 2 | 2 | 3 |
| 1 | 3 | 1 | 3 |
| 1 | 3 | 2 | 2 |

FIG. 14

| Experiment ID | Test Store ID | Category ID | Event Sequence | Pre Period Length | Post Period Length | Pre Value | Post Value | Change |
|---|---|---|---|---|---|---|---|---|
| 1 | A | X | 4 | 2 | 2 | 100 | 120 | 20 |
| 2 | A | X | 6 | 2 | 1 | 120 | 100 | -20 |
| 3 | B | X | 4 | 2 | 2 | 100 | 110 | 10 |
| 4 | C | X | 5 | 3 | 1 | 100 | 120 | 20 |
| 5 | E | X | 6 | 2 | 1 | 100 | 90 | -10 |
| 6 | F | X | 2 | 1 | 3 | 70 | 80 | 10 |

| Experiment ID | Control Store ID |
|---|---|
| 1 | D |
| 1 | E |
| 1 | F |
| 2 | B |
| 2 | D |
| 2 | E |
| 2 | F |
| 3 | D |
| 3 | E |
| 3 | F |
| 4 | D |
| 4 | E |
| 4 | F |
| 5 | B |
| 5 | D |
| 5 | F |
| 6 | C |
| 6 | D |
| 6 | E |

NATURAL EXPERIMENT FINDER SYSTEM AND METHOD

CROSS-REFERENCE TO RELATED APPLICATIONS

This application is a continuation-in-part of U.S. patent application Ser. No. 13/337,498, filed Dec. 27, 2011, entitled "Natural Experiment Finder System and Method," which is hereby incorporated by reference in its entirety.

FIELD OF THE INVENTION

The present teaching relates to methods, systems, and programming for evaluating business initiatives using natural experiments.

BACKGROUND

For centuries, scientists have relied on the scientific method to prove or disprove hypotheses about causality in our world. In order to show that an action (A) will cause an outcome (B), scientists typically execute a controlled experiment where the action (A) is performed on one population (a test group), and compare the outcome to a similar population where the action was not performed (a control group). Any consistent and repeatable difference in outcome (B) is then considered to be caused by the action (A).

In recent years, this approach has been adopted by retailers, banks, manufacturers, restaurants, hotels, schools, and insurers, among others, to assess the incremental impact of any business initiative on customer behavior and, hence, key performance metrics (such as customer count, revenue, and profit). These companies apply the scientific method by executing a designed test of the initiative in a subset of their locations and comparing their performance to locations that did not receive the initiative. Because the initiative was actually tried in a subset of stores, and their performance was compared to stores that did not receive the initiative, the business can have a confident perspective on "what will happen" if they execute the initiative going forward.

Examples of these business initiatives include: changing prices, moving products to different areas of the store, introducing new products, adding or reducing sales staff, remodeling older stores, and running television ads. Knowing how these initiatives will contribute to the business's profitability before committing to a major network-wide investment allows them to more accurately predict which ideas will work and which will waste valuable capital.

However, actively designing and executing a test can be a costly and time-intensive exercise. At the same time, for initiatives such as price changes, advertising, and changes in sales staff (as well as uncontrollable events such as weather and economic conditions), store-by-store variations already occur on a daily basis. For example, a district manager may decide to reduce price on a key product in his 20 stores, or a store manager may decide to take on an additional employee to help out during the lunchtime rush. Regardless of the intention, these small variations can be thought of miniature tests, or "natural experiments," and can provide much the same insight as a designed test.

Automatically detecting such experiments can be hugely valuable to a business. First, they can be used as a substitute for actively designed tests. Executing a designed test takes significant resources between to determine the action to take, address operational complexities, coordinate its implementation, wait for it to be in market long enough, and measure the action for its effectiveness. This feedback delay lengthens the time before any resultant profit-generating action can be taken, reducing its return on investment and constraining the number of tests that are feasible to run. Second, these natural experiments can provide insights on-demand that lead directly to massively profitable changed decisions. For example, figuring out whether a bottle of soda should be priced at $0.89, $0.99, or $1.09, given that it costs the retailer $0.50, can swing profits by as much as 50%, depending on consumer response to each price point.

Because these variations occur as a natural course of business and are not centrally coordinated or explicitly tracked (in contrast to a central list of stores to be remodeled), it can be very challenging to discover these examples in order to use them to assess the impact of the changes. However, because these companies are already tracking metrics such as labor hours, price charged, and advertising levels by store and by day, there exists an opportunity to automatically mine these datasets to detect instances where part of the network changed and part of the network did not, which may be considered "natural experiments."

There are basically two existing alternatives to assessing the incremental impact of historic changes: (1) econometric modeling/time series regression, and (2) manually finding natural experiments. Econometric modeling uses each individual store/day combination as one observation of both the "independent variable" (e.g., price) and the "dependent variable" (e.g., units sold), and performs a basic statistical regression between the two. Econometric modeling uses a standard statistical technique, tests whether a significant relationship exists, and if so, quantifies the size of change in units that is commonly associated with each $1 change in price. This conventional approach is commonly used, particularly in the advertising industry, to assess the historic incremental impact of different actions. Almost all major advertisers employ media mix modeling using consultancies that apply multivariate regression modeling techniques to (1) establish the portion of historic sales that were due to advertising, and (2) forecast what incremental sales will be generated by future advertising plans. For example, a store may desire to predict how a new promotion will impact their sales. So they would build a regression model to predict sales within a time period. The model would consider all factors as variables (e.g., how much inventory was available, the use of media advertisements, the weather) and the coefficient for each variable would correlate its impact.

Econometric modeling has some shortcomings. Fundamentally, this type of modeling tests for correlation, not causation. As an example, imagine the business question being whether an increase in inventory (units on hand to be sold) of a particular product will drive an increase in sales. At the same time, assume that stores with strong sales of that product have already adjusted their inventory upward to accommodate demand. Regression analysis will identify that inventory is highly correlated with sales and an econometric approach may therefore assume that future increases in inventory will cause more sales. But in this case, it is more likely that it is the higher expectation for sales that drives the higher inventory and not the higher inventory is driving the higher sales. So drawing conclusions from correlational studies can be inaccurate, and a more rigorous test versus control approach to high stakes business decisions is needed. Finding test versus control opportunities to establish causation between a business's specific actions and resultant changes in profitability is generally recognized as a superior approach. This, for example, is why the Food and Drug Administration asks for test versus control (also known as placebo) tests to validate drug effectiveness and safety instead of relying on cross-sectional studies and regression modeling. However, it may be challenging to find or create such examples in a business environment.

A user can manually attempt to find natural experiments in the same datasets, but the user must look through each week of data for a group of stores that changed and a group of stores that did not. This method has some shortcomings, as it is highly time-intensive, complex, and error-prone. As a result, it can be very challenging to find the best subset of "test" stores that balances consistency and length of the experiment with similarity to the "control" group.

What is desired is a system to automatically scan historic datasets (e.g., price by store over time) to: (a) detect the dates on which pockets of stores change in a consistent manner while other stores do not; (b) determine the best subset of test and control stores to be used, balancing store count (in both test and control), internal consistency of the change (in test), similarity (between test and control), and length of the change; (c) compile a list of all the experiments found, and present a rank ordered list with the "best" natural experiments at the top; and (d) allow the user to select which experiments to be analyzed (measurement of the change's impact on key performance metrics).

SUMMARY

The conventional scientific method of using test versus control analysis is often considered the accepted best practice for establishing causality. In the business world, many companies apply this concept to determine which actions they could take will generate the most profit improvement. However, it can be challenging, costly, and time-intensive to dimension, execute, and measure a planned test versus control experiment.

"Natural experiments" or naturally occurring pockets of differential treatment in subsets of a business' network can provide much the same insights as designed tests, but can be difficult to identify. It is desirable to have an algorithm that can scan historic datasets of treatment across a network to identify natural experiments for test vs. control analysis would be hugely valuable for these businesses.

The methods and systems described herein attempt to address the above-mentioned need by providing an algorithm and software capability to automatically detect and assess "natural experiments" that exist in any underlying dataset.

In one embodiment, a computer-implemented method for identifying an experiment to use in an analysis of a business initiative comprises storing, by a computer, a set of historical data regarding entities in a business network; receiving, by the computer, a selection of inputs for the historical data; detecting, by the computer, a natural experiment based upon changes in the historical data; and outputting, by the computer, a report of a detected experiment from the historical data.

In another embodiment, a computer implemented method for identifying an experiment to use in an analysis of a business initiative comprises storing, by a computer, a set of historical data for a metric for a plurality of locations; identifying, by the computer, from the historical data a potential experiment where a test location has a change in the metric beyond a predetermined threshold on two consecutive dates; determining, by the computer, a length of the potential experiment for each test location; identifying, by the computer, a set of control locations for the potential experiment; determining, by the computer, how many potential control locations qualify as a control locations based upon the length of the potential experiment; and generating, by the computer, a list of experiments based upon the potential experiments that have a set of control locations greater than or equal to the length of the potential experiment.

In yet another embodiment, a computer-implemented method for identifying an experiment comprises identifying, by a computer, a set of test candidates based on changes in a value of a metric at a predetermined frequency, wherein the difference between a pre period value and a post period value of the metric are is a threshold value; identifying, by the computer, a set of control candidates for each test candidate where there is substantially no change between the pre period value and post period value of the metric above the threshold; determining, by the computer, a minimum number of control candidates for each test candidate; and identifying, by the computer, an experiment where a test candidate has a number of control candidates that is the same or greater than the minimum number of control candidates.

In another embodiment, a computer-implemented method for identifying an experiment comprises receiving, by a computer, a selection of a metric for a set of historical data; receiving, by the computer, an input of a threshold for a change in the metric, wherein a candidate test location has a change in the metric greater than the threshold for consecutive dates; generating, by the computer, a set of all candidate experiments where the metric for a test location changes by an amount greater than the threshold on two consecutive dates; determining, by the computer, a pre period length and a post period length for each candidate test location; identifying, by the computer, a set of potential control locations for the list of all candidate test locations; determining, by the computer, a pre period length and a post period length for each potential control location; determining, by the computer, an optimal length of an experiment based upon the pre period length and post period length of each candidate test location and the pre period length and post period length of each potential control location; determining, by the computer, a minimum number of control locations for the optimal length of the experiment; and generating, by the computer, a set of experiments from the set of candidate experiments where the test location has at least the minimum number of control locations Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 shows a sample data set according to an exemplary embodiment.

FIG. 5 shows a sample data structure according to an exemplary embodiment.

FIG. 6 shows an exemplary data table according to an exemplary embodiment.

FIG. 9 shows an output of the sample data according to an exemplary embodiment.

FIG. 10 shows an output of the sample data according to an exemplary embodiment.

FIG. 11 shows an output of the sample data according to an exemplary embodiment.

FIG. 12 shows an output of the sample data according to an exemplary embodiment.

FIG. 13 shows an output of the sample data according to an exemplary embodiment.

FIG. 14 shows an output of the sample data according to an exemplary embodiment.

FIG. 15 shows an output of the sample data according to an exemplary embodiment.

FIG. 16 shows an output of the sample data according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Generally, if a client wants to know the effect of a change in one metric (e.g., the effect of an increase in inventory), the system analyzes a stream of historical data to identify natural experiments. In an effort to find a natural experiment, the client's historical data can be analyzed to find stores whose inventory spiked or dropped while the inventory of other stores did not spike or drop at the same time. When such an instance occurs, the system informs the client that a natural experiment has been found and may be useful for the client's analysis of the business initiative.

Figure 1:
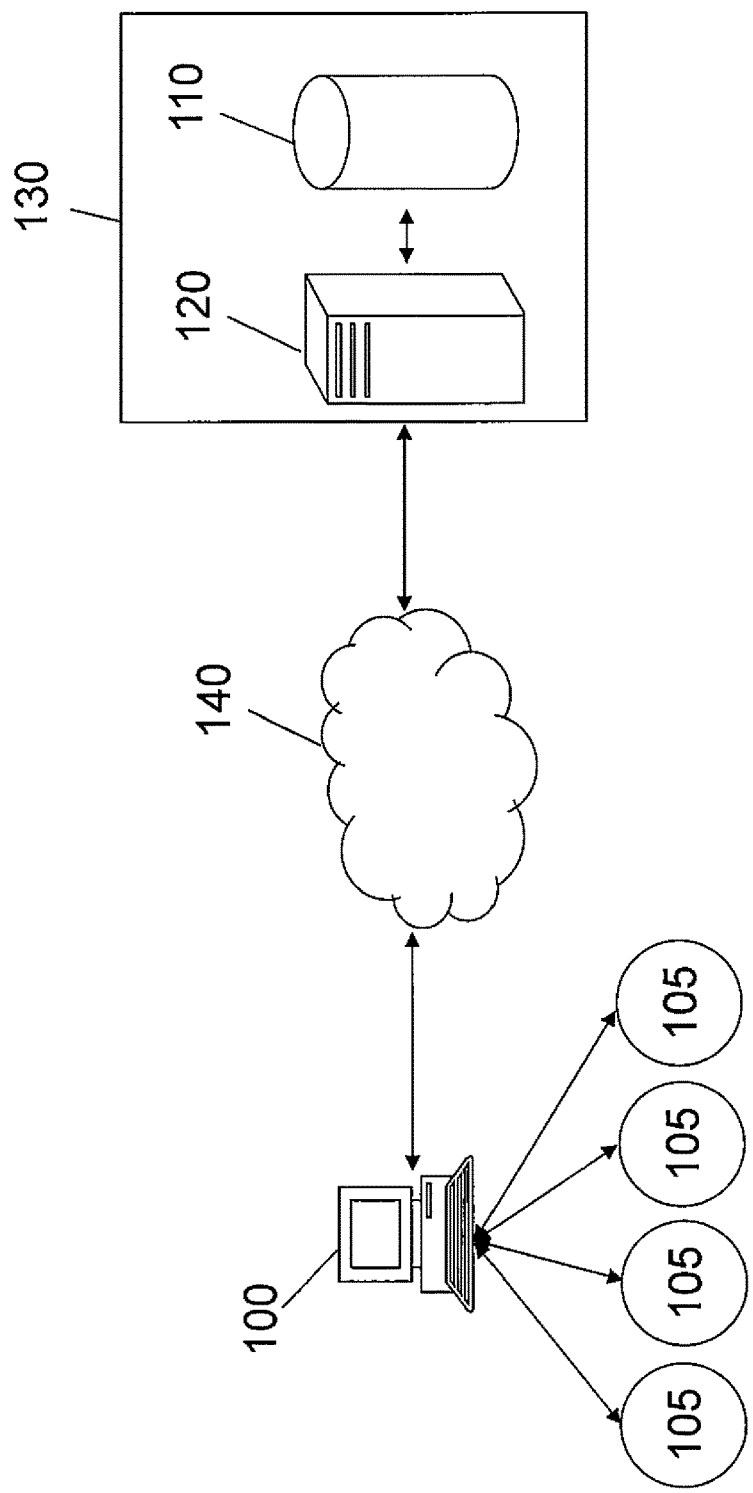
FIG. 1 shows a system overview according to an exemplary embodiment.

Referring to FIG. 1, an exemplary system diagram is shown. A client has a business network comprised of various entities 105, which may be business locations, stores, sites, students, accounts, customers, products, services, regions, patients, or other types of entities. Although the exemplary embodiment often refers to the entity as a "store," it is intended that any type of entity can be used. The entities 105 may provide similar products and/or services to customers. In some embodiments, the entities 105 may be geographically dispersed.

A client computer 100 can represent one or more computers of the client, who may manage the various entities 105 or track data regarding the entities 105. In one example, for a consumer business, the client can be an organization headquarters or a marketing division for one or more entities 105 (e.g., a grocery store chain that determines which products and/or services each retailer location should provide). In some embodiments, each entity 105 can have its own client and computer 100. In other embodiment, a client and the computer 100 can be used for multiple entities 105. One or more users (not shown) may operate the computer 100. The computer 100 can be a desktop computer, workstation, laptop, personal data assistant, tablet computer, mobile phone, or any other similar computing system operated by a user. The computer 100 may use its processor to execute browser software stored in memory that enables a user to request, receive, and render information from a network 140.

The network 140 may be a shared, public, or private network and may encompass a wide area or a local area. The network 140 may be implemented through any suitable combination of wired and/or wireless communication networks. For example, network 140 may be implemented through a wide area network (WAN), local area network (LAN), an intranet, and/or the Internet. Further, network 140 may represent multiple networks, such as a wireless carrier network connected to the Internet.

The computer 100 transmits or otherwise provides historical data regarding entities 105 to a host entity 130. In this exemplary configuration, the host entity has a server 120 is coupled to the database 110, though the server 120 and the database 110 can be combined into a single device or each comprise multiple devices. The server 120 can be a computer system such as a desktop computer, workstation, or any other similar server side computing system that performs one or more service-side processes. The server 120 can have an interface unit for communicating information to and from the client's computer 100 over the network 140. In some embodiments, the server 120 may communicate with another server, such as a web server, that can more directly communicate over the network 140. The server 120 can use its processor to execute a computer program stored in memory that can access and analyze the data stored in the database 110.

The database 110 can comprise one or more memory devices that store data and/or executable software that is used by the server 120 to perform processes consistent with certain aspects described herein. The database 110 may be located external to server 120 and accessible through the network 140 or other network, such as a dedicated back-end communication path. In one embodiment, the database 110 can be located at the client or another location, such as with server 120. The database 110 can be populated with records about the client's historical data for various locations, sales, promotions, pricing, personnel, and the like. The client computer 100 can communicate with the server 120 to request analysis and view results.

In one embodiment, the client uses computer 100 to communicate over the Internet 140 with the host entity's server 120. The computer 100 may use a thin client, such as a web browser, which accesses a website hosted by the host entity 130. The client may be prompted to enter a username and password into the web browser on the computer 100. The client can be authenticated to access data and perform analysis of that data. Alternatively, the client may request that another entity, such as the host entity 130 perform the analysis of their business initiative.

The database 110 stores historical data for a client. The data can be gathered over time, or the data can be gathered by a client and transmitted to a host entity for analysis of the data once all of the data has been collected.

The server 120 uses various inputs, some of which may be entered by the client, an administrator of the server 120, or other party. The inputs may also be set as default settings on the server 120 and may be customized by the client or administrator. In the exemplary embodiment, an entity that enters an input or maintains the system having a particular input is referred to as a user, though the user may include the client or an administrator.

A user inputs an experiment "change" threshold, either as a percentage or as an absolute number. For example, price must change by 5% or $10. In order to qualify as an experiment, the metric must have a change greater than this threshold on consecutive dates. The user inputs this data based on business knowledge and understanding for a particular data set.

The user also inputs a data set to be searched. This includes a metric (e.g., price, target rating points (TRPs), inventory level, labor hours) and a set of one or more categories (e.g., all products, television and radio).

Other optional inputs may be included. A filter may be used to limit the set of data. For example, the filter may limit the data to a specific set of stores, locations, geographies, customers, or other entities to consider. In another example, a filter may limit the data to a specific date range. In yet another example, a filter may limit the data to a specific set of categories or products.

An experiment extension threshold may be applied. The experiment extension threshold is a maximum variation allowed in one of the stable periods of an experiment—in either the pre period or post period—in order to say the experiment is still ongoing. This threshold can be expressed as a percentage or an absolute number. If the user does not input the experiment extension threshold, then the system can infer a value. For example, if the user inputs an experiment change threshold of 5%, the extension threshold can be set to half of this value or other default setting.

The user can optionally input a minimum pre period length, which is the minimum length of pre period that is required to consider a certain experiment. This length can be set by the user based on business knowledge. For example, a user may want to set a threshold of 4 weeks when looking for price changes to ensure that there is a stable baseline of behavior before the change. If the minimum pre period length is not input by the user, the default setting can be 1 unit of the metric frequency (e.g., 1 day, 1 week, 1 month). The user can also optionally input a minimum post period length.

The user can optionally input a maximum control change threshold, which represents the maximum change allowed by stores in order to be considered as consistent control stores. If this threshold is not inputted by the user, the system can infer this value. For example, if a user inputs an experiment change threshold of 5%, the control threshold can be set to half of this value or other default setting.

The user can optionally input an acceptable minimum number of control locations for each experiment. The user can set the minimum number of control locations based on business knowledge in analyzing certain types of experiments. For example, certain analysts may be comfortable with measuring a test only if at least 5 control stores contribute to the baseline. If the minimum number of control locations is not provided by the user, the default can be set at 1 control store.

The system may also receive other inputs from the user. Exemplary inputs include a metric, a timeframe, a list of entities, a minimal change, a minimum experiment size, a minimum number of test entities, a minimum number of control entities, a difference between the minimum number of test entities and a minimum number of control entities, labor hours, media expenditures, geographic media use, a weather metric, a geographic limitation, an entity list, a minimum experiment pre-period length, a minimum post-period length, an external market factor, a delay time period, a number of time periods to aggregate, unemployment rate, coupon redemption rate, inventory levels, space allotment (e.g., linear shelf space), and customer survey scores. A "metric" can be the dataset to be scanned for historic changes (e.g., price). A "timeframe" can be a specific period of time (e.g., the most recent two years of data), whereby the selected dataset can be optionally filtered for only that timeframe. An "entity list" can be a specific set of entities (e.g., all stores that have been open for at least two years), whereby the selected dataset can be optionally filtered for only that entity list. In one example, the entity list can be based upon location, whereby the list includes all entities in that location. A "minimal change" can be the smallest possible change in the metric being scanned that is of interest to the user. Natural experiments involving changes smaller than this will be excluded from the final results (e.g., $0.50). A "minimum experiment size (test and control)" can be the smallest acceptable number of test locations and control locations for a natural experiment to be considered big enough to be of interest. These user inputs are merely exemplary and may change as long as it remains within the scope of this description.

Figure 2:
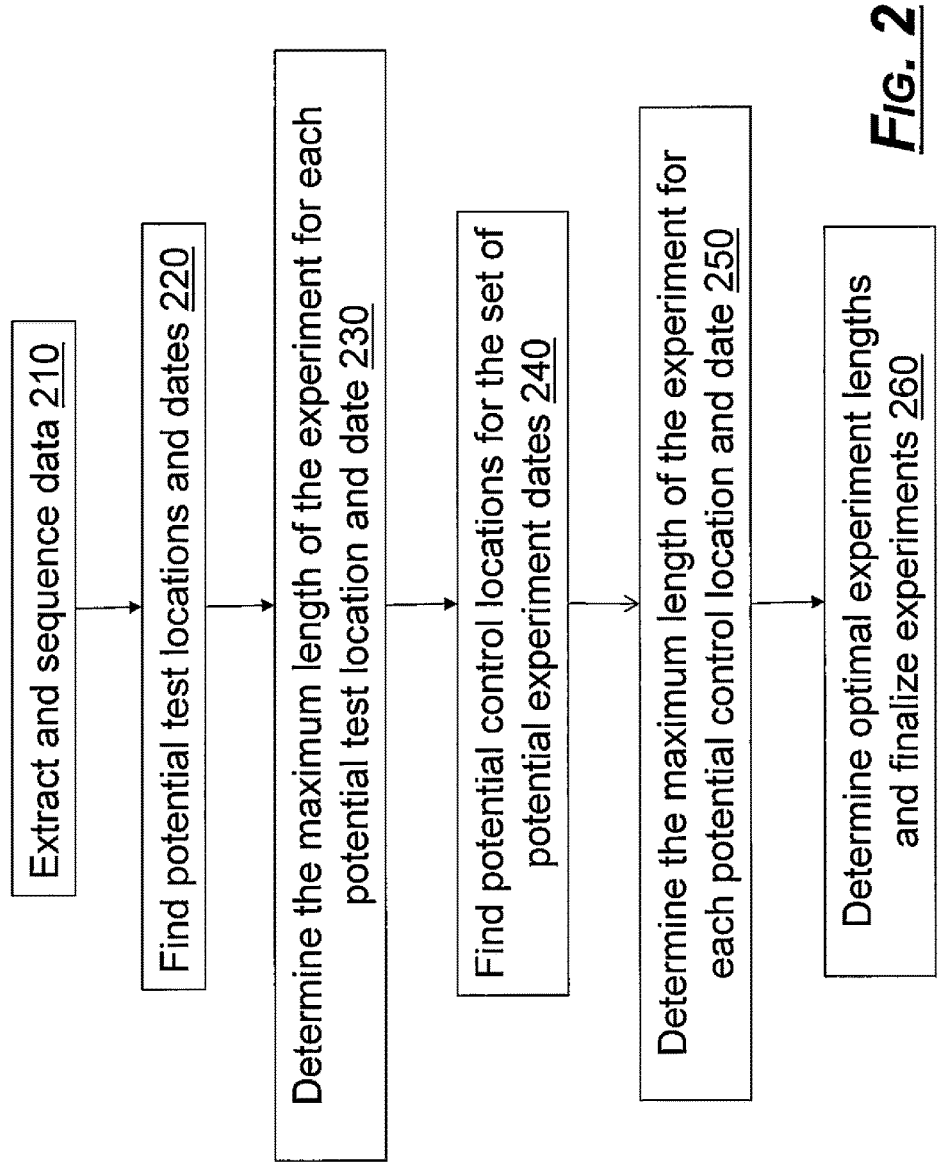
FIG. 2 shows a flow chart of a method according to an exemplary embodiment.

As shown in FIG. 2, an exemplary algorithm implemented using the system above has the following steps. In step 210, extract and sequence data. In step 220, find potential test locations and dates. In step 230, determine the maximum length of the experiment for each potential test location and date. In step 240, find potential control locations for the set of potential experiment dates. In step 250, determine the maximum length of the experiment for each potential control location and date. In step 260, determine optimal experiment lengths and finalize experiments.

Referring to FIG. 3, a sample set of data for the price of a particular product for six stores over a time period of six weeks is shown. In this example, the price is an inputted metric and the particular product is an inputted category.

Figure 4:
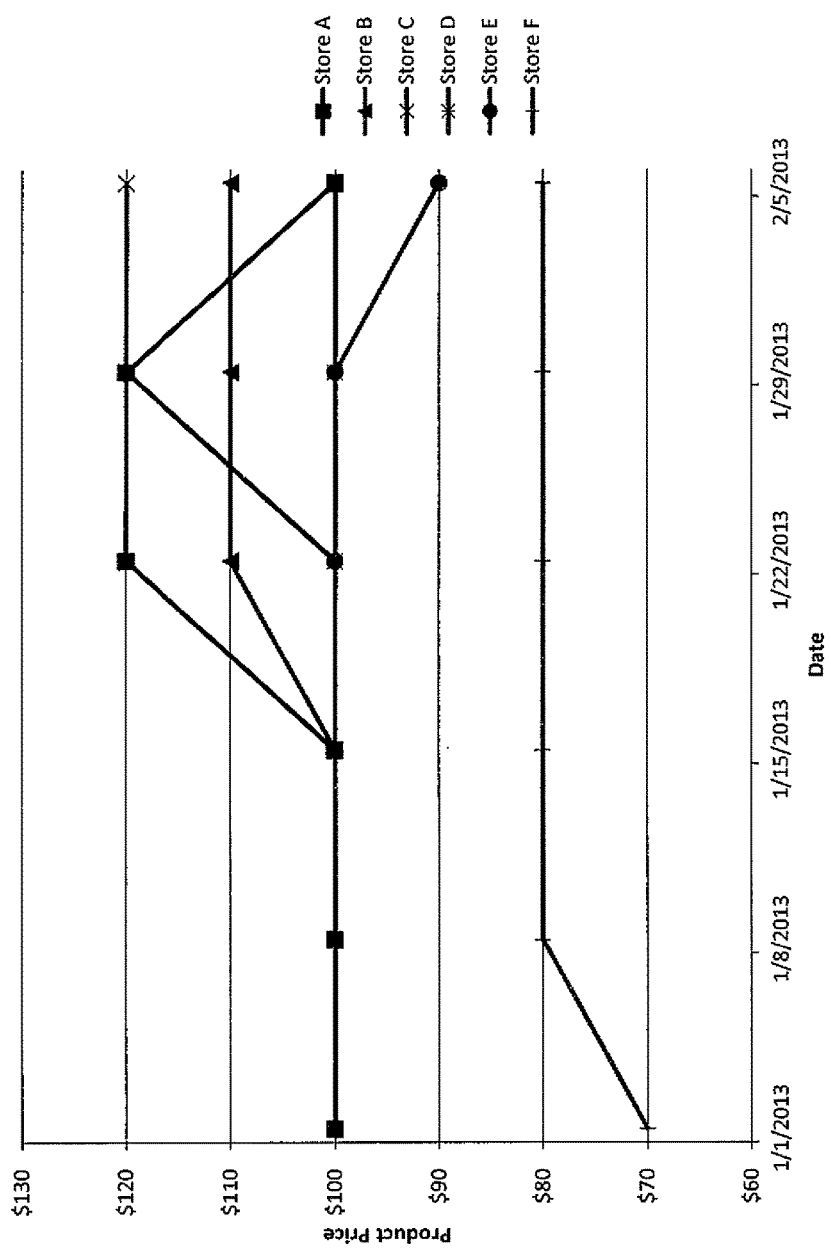
FIG. 4 shows a data set visualized over time according to an exemplary embodiment.

Referring to FIG. 4, the data set shown in FIG. 3 can be visualized over time.

The exemplary algorithm is described in further detail below using the exemplary data set shown in FIGS. 3 and 4. This data set is intended to be illustrative and not representative of the magnitude or volume of data in real applications In particular, this data set includes prices for only one product, while the algorithm could be used to process many products in parallel if searching for a given metric (e.g., price). For example, users can search for all price changes across all of the products in their stores, even if this is tens or hundreds of thousands of products.

In step 210, data is extracted and sequenced. In order to efficiently process different sets of data, the algorithm extracts the data into a consistent format. This process involves 3 components: (1) filtering the full data set based on any optional user inputs; (2) normalizing the data; and (3) converting the time series data to use date sequences.

The complete data set is filtered based on optional user inputs. The inputs are optional and may include: (1) a specific sub set of stores, locations, geographies, customers, or other entities to consider; (2) a specific date range to consider; and (3) a specific set of categories or products. If these inputs are not specified, the entire data set may be used.

The data is also converted to a consistent normalized format if it is not already in such a format. This format has a structure shown in FIG. 5, where only one sample row shown, having columns for date, store ID, category ID, and metric value.

In some instances, it may be sufficient to search for experiments in the selected metric "as is." For example, television target rating points (TRPS) may already be normalized. However, it may be advantageous to manipulate the metric or other input before searching for experiments. The user can decide whether to manipulate the data, which can be done in at least two ways: (a) normalization, and (b) category indexing. In one embodiment, the client or other user can select the method of manipulation. In another embodiment, the system automatically chooses the type of manipulation.

Normalization may be used where the metric size varies greatly. In certain instances, when metric values are of widely different magnitudes across locations, it may be more useful to search for experiments that identify consistent percentage changes rather than absolute changes. When looking for natural experiments in labor allocation, entities (e.g., stores) of different sizes may have very different magnitudes of values (e.g., total labor hours). For example, a large store may have many more labor hours than a smaller store. So in order to be able to find entities that exhibit equal shifts in such a size-dependent metric, for example, the data can be normalized to use more relative terms. In one example, the user can compare percent changes (e.g., 10% increase in labor hours) rather than absolute changes (e.g., 100 hour increase in labor hours). In such a situation, the metric can be normalized for each individual entity. This normalization can take one of a few different forms.

In one option, all values in the time period for each location can be divided by the average for that location over the entire time period. This sets the average of all stores to 100% and allows the natural experiment finder to look for similar deviations in averages across multiple locations.

In a second option, all values in the time period for each location can be divided by the first value in the period for that location. This sets all locations on an equal level at the start of the search period and looks for similar relative deviations from the initial period.

In a third option, the data can be re-normalized for each individual reporting date by dividing all values in the time period by this reporting date's value for each entity. This re-sets an equal baseline for each reporting date and allows the user to search for experiments where there is consistent relative deviation across entities using any date as a starting point.

The data can also be manipulated by category indexing. Because an exemplary embodiment analyzes a price, the category indexing may be referred to as category price indexing, but it is intended that category indexing can be used for any hierarchical metric or other input. A category may include numerous products at different prices, which should be accounted for when considering a metric such as revenue per unit. In some instances, shifts may be based on a customer's purchase of a higher product prices within a category. For example, if the price of all products in a category of products remained constant over time but 10% of the customers shift from the lowest revenue product in that category to the highest revenue product in that category, the average revenue per unit for that category will increase. However, this will be caused by a change in the mix of products purchased and not by a price increase. If the goal was to find natural pricing experiments and the metric used is average revenue per unit, then without category indexing, this approach would identify what looks like price experiments but were actually just changes in the product mix. As a result, these types of shifts in the product mix should not be identified as experiments because they do not correspond to an action taken by a client (e.g., a price increase or decrease). So category indexing can account for mix shift in the distribution of the underlying products by keeping the mix constant and using it as a weighting constant, so there is no change in the metric unless at least one of the product prices actually changes. When dealing with metrics in a hierarchical category structure, it may be useful to account for the mix of the values in the underlying lower level categories.

For example, when searching for price changes in a "milk" category, which contains dozens of individual underlying products (e.g., skim milk, whole milk, organic milk), it may not be sufficient to search the price metric as is. As a result, natural experiments may exist where price is not actually increasing or decreasing, but a shift towards higher priced or lower priced milk products causes the average unit retail metric to increase or decrease. This phenomenon is known as "mix shift" and can cause false reads in identifying experiments. In order to account for this shift and isolate only experiments where the price of underlying milk products actually changed, an index metric can be created that holds product mix constant.

In another example, if customers are buying a more expensive twelve pack of beer in a store, then there is no price increase, just a different mix of purchases within the category. So category indexing can filter out false positives for what appears to be price increases or decreases but are really shifts to more or less expensive products within that category. So category indexing allows products to be differentiated based on different categories (e.g., beer), sub-categories (e.g., cans), and SKU numbers (e.g., specific SKU for a particular can of beer).

A category index metric (or price index metric) can be created by, first, determining the average product sales or unit mix across the time frame. For example, skim milk makes up 20% of the milk category on average, while low fat milk makes up the remaining 80%. Second, these mix values are used as a weighting factor for the product prices to come up with a category price index for the higher level category. For example, if in a given location on a certain date skim milk is $2.00 while low fat milk is $4.00, the price index for milk becomes:

$$0.2*2.00+0.8*4.00=\$3.60$$

Using this method, shifts in mix across individual dates and locations will not change the value of the price index metric and therefore no false experiments will be discovered. This indexing process can be further refined based on user input to (a) use mix in each individual store as the weighting factor for that store, which may be advantageous if product mix varies significantly across locations (e.g., winter coats may have a much higher product mix in colder locations); (b) use a chained index to account for variations in mix over time, which may be advantageous if product mix is very seasonal (e.g., winter coats may have a much higher product mix in the fall and winter versus the spring and summer); or (c) a combination of the two above, which may be advantageous when product mix varies significantly both across locations and over time.

The category index can be based upon a mix of products or some other attributes. For example, the category index can be based upon store level rather than a mix, because a mix may not be consistent across all stores. In another alternative, the price index can account for variations over time, such as analyzing the values (e.g., at a store level or mix) on a weekly basis.

Chain indexing is a time dependent index that can account for variations in mix over time. For example, if a store has a first product that makes up about 60% of sales in a category and a second product that makes up about 40% sales in a category, then the weighting factors will be determined based on those percentages. But those percentages may change over time. If the second product increases from 40% to 50% from one period to another period, then those percentages can be averaged (45%) for a weighting that accounts for the variation over time.

The data can be adjusted to use date sequence numbers rather than actual calendar dates. This can be done in order to be able to provide consistent units of time across all stores. For example, if the data is reported by stores weekly, but some stores report on Friday while others report on Saturday, these values should be treated as being on the same weekly sequence rather than as different calendar dates. The end result of this process is a table (on the database or in-memory) that has columns for sequence, store ID, category ID, and metric value. An exemplary data table is shown in FIG. 6.

Figure 7:
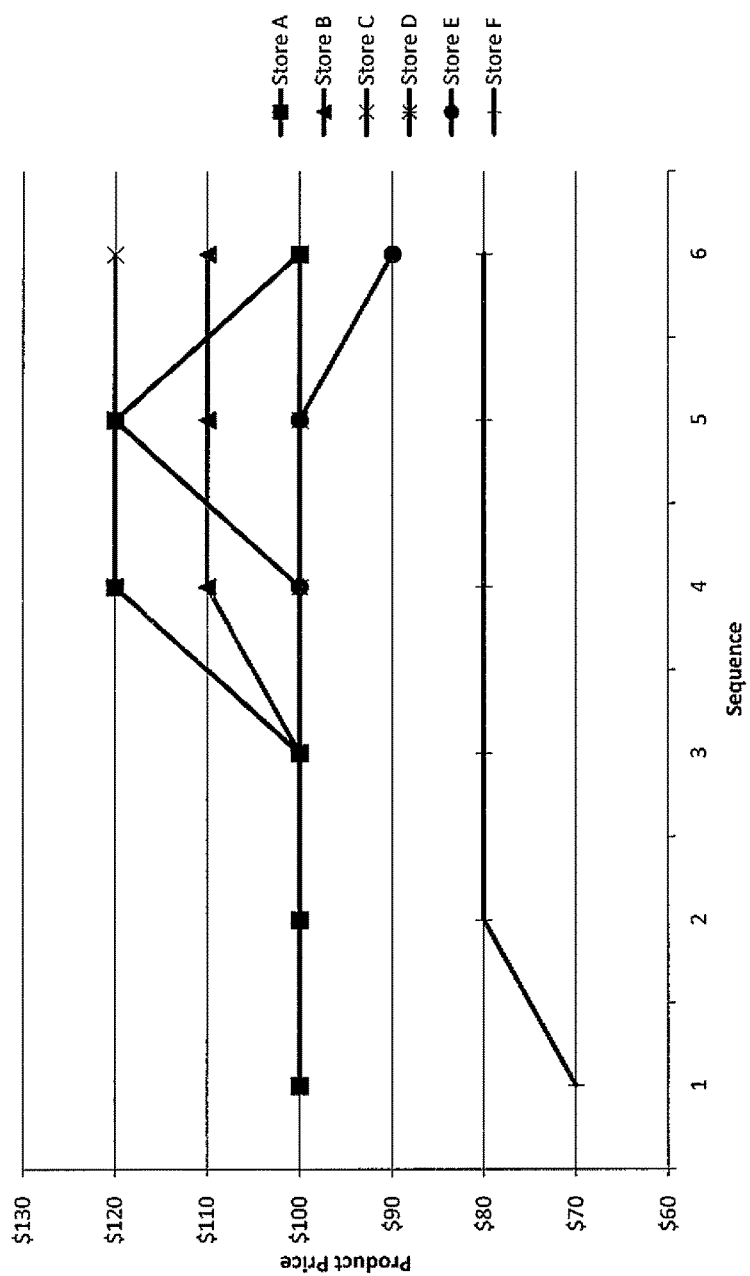
FIG. 7 shows a data set visualized over time according to an exemplary embodiment.

FIG. 7 illustrates an updated visualization of the data with sequence numbers. The remaining steps in the algorithm assume that the data is in this format. The algorithm can also accommodate multiple sequences, stores, and categories.

In step 220, potential test locations and dates are identified. After the data is in a consistent format, the next step is to find and generate a list of all potential test locations and dates. These potential experiments are defined as two consecutive sequences for an individual test location where the metric value changes by a factor larger than a change threshold input by the user. This threshold can be in either percentage or absolute terms. For example, one value for this input could be that the metric must change by at least 5%. In another example, the metric must change by at least $10. The algorithm scans through the data for all stores and categories to find all of these potential experiments. The system reports these potential test locations in a table of the format: potential experiment identification (an identity column created for each result), event sequence, store identification, category identification, pre (start) value, and post (end) value. The event sequence is defined as the first sequence after the change has taken place (also known as the first sequence in the "post period").

Figure 8:
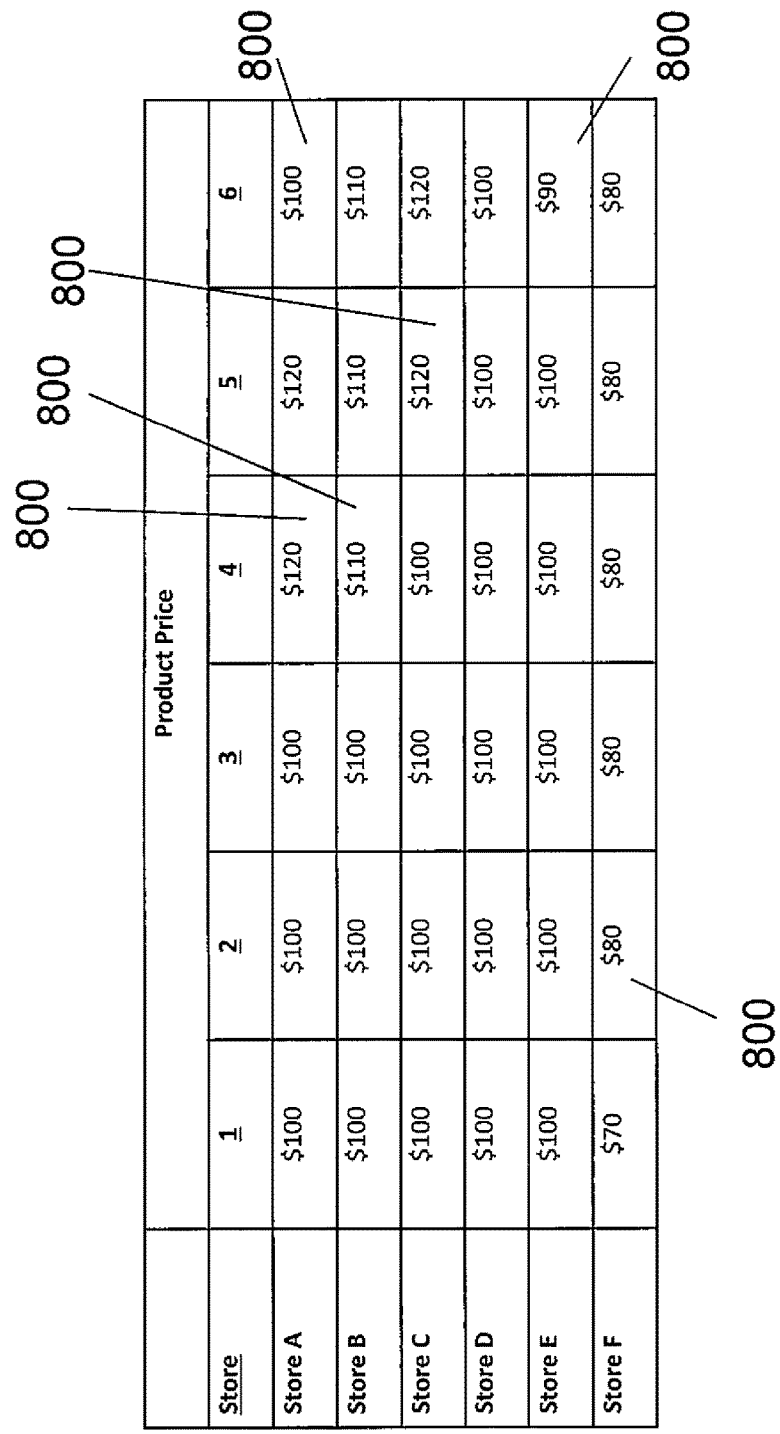
FIG. 8 shows price changes in a data set according to an exemplary embodiment.

In an example, the system looks for price changes of at least 5% on the sample data set. Referring to FIG. 8, The algorithm would identify 6 potential experiments 800 where the price changed by at least 5%, increase or decrease, on consecutive sequences.

FIG. 9 illustrates an output for the sample data, which includes the columns from FIG. 5 along with pre value and post value. The sample data includes the identified potential experiments from FIG. 8 along with the event sequence, store ID, category ID, pre value and post value.

In step 230, the algorithm determines, for the set of potential experiments, the maximum possible length of the experiment. The algorithm is concerned with length in two directions. First, the algorithm determines a maximum length before the experiment that the test location remained stable at the "pre value." This period is defined as the "pre period." Second, the algorithm determines a maximum length that the location remained at the post value after the experiment sequence before making another change. This period is defined as the "post period." In business applications, it is desirable to find experiments that are as long as possible in both directions. If experiments have a sufficiently long pre period, it means that there will be a stable baseline before the change. Similarly, if experiments have a sufficiently long post period, it means that we will be able to measure the reaction to the change over a more stable period of time.

The algorithm determines these lengths using a parameter that is either set by the user or inferred based on other inputs. This parameter represents the "experiment extension threshold" and is defined as the maximum change from the starting value that is allowed in order to extend the experiment. For example, if the pre value is $100 for a given potential experiment and the extension threshold is 2%, only values between $98 and $102 will be considered valid sequences to extend the pre period of the experiment.

For each experiment, the algorithm scans the data on either side of the experiment—working forwards from the event sequence for the post period and backwards from the sequence before the event for the pre period—to determine the first sequence that has a value outside of the acceptable range. For example, if the extension threshold is 2%, the algorithm would find that for potential experiment number 1, the first sequence that falls outside of the acceptable range in the post period is sequence 6 ($100 is outside the range $117.6-122.4). As a result, the last post period sequence would be set to the previous sequence—sequence 5—and the post period length would be reported as 2—sequences 4 and 5. For the pre period for potential experiment 1, no value falls outside of the range ($98-$102) in this data set, so the minimum pre period value would be set to sequence 1 and the pre period length reported as 3 periods.

The resulting output is a table indicating the pre period and post period length for each potential experiment. For the sample data set, the output—given an extension threshold of 2%—is shown in FIG. 10.

At this point, the list of potential experiments can also be filtered by optional user inputs for required minimum pre period and post period lengths. For example, if a user wants to find only experiments with a pre period length of 2 weeks in order to ensure stability before the change, potential experiment 6 would be removed.

In step 240, potential control locations for the set of potential experiment dates are identified. Now that the full set of potential experiments has been defined, the next step is to find potential control locations. For each event sequence identified as a potential experiment, the system finds all locations whose metric value remained substantially constant over the sequence preceding the event and the event sequence. Because the system is dealing with continuous values, "remained constant" is defined as using another parameter called the "maximum control change threshold." This parameter can either be input by the user or inferred from other inputs and represents the maximum change allowed by control stores in order to be considered constant. For example, the threshold value might be 1%, which means that only stores that change by less than 1% during the event sequence can be considered as potential control.

On the example data set, the algorithm would first determine that it only needs to look for control on sequences 2, 4, 5, and 6 based on the identified potential experiments (sequences 1 and 3 had no potential experiments). Focusing on event sequence 2, stores A through E could all be considered as a control for any experiments on this date. All 5 stores had prices of $100 for both sequence 1 and sequence 2.

The output of this step is a table indicating potential control locations for each event sequence. As shown in FIG. 11, for the sample data set, the output—given a maximum control change threshold of 1%—is shown.

In step 250, the maximum length of the experiment for each potential control location and date is determined. After identifying potential control locations, the next step is to determine how long into the pre period and post period each of these stores would still be eligible as control stores. This process is very similar to the process in step 230 for determining similar period lengths for test stores. One difference is in the parameter used to determine the length of each period. Instead of using the experiment extension threshold as in step 230, the algorithm uses the maximum control change threshold, similar to step 240. Similar to step 230, the algorithm looks for both pre period and post period lengths for each potential control location by finding the first sequence that falls out of the extension bounds.

The output is a pre period and post period length for each potential control location for the previous step. For the sample data set, the output—given a maximum control change threshold of 1%—is shown in FIG. 12.

The length of the control periods are not yet subject to constraints based on the potential experiments that have been found. Relatedly, control potentials are not yet linked to individual experiments. A reason is that one control potential can end up as a control store for multiple experiments (i.e., for different test stores on the same sequence). In the next step, the control potentials are combined with the test potentials to determine lengths and finalize the experiments.

In step 260, optimal experiment lengths and finalized experiments are determined. At this point, all of the data mining steps are complete and there is a full set of information on possible test and control locations. The algorithm then combines all of this information to determine the optimal version of each experiment and form experiment definitions.

The first part of this step is to determine all possible lengths for each experiment. This is done by taking the union of the possible permutations pre period and post period lengths of the test store along with all the potential control stores on that sequence that are less than or equal to the test store period lengths.

For example, using potential experiment 1 in the example data set, the test store, Store A, has a pre period length of 3 and a post period length of 2. Additionally, this experiment takes place at sequence 4 and there are several potential control locations for that sequence with different lengths. For example, Store C has a pre period length of 3 and a post period length of 1. In fact, taking the union of all of these different individual period lengths and excluding any that are longer than the test periods lengths, there are 4 different potential options, as shown in FIG. 13, which shows pre period and post period lengths for potential experiment 1. As shown in this example, numerous options for various per period and post period lengths are shown for potential experiment 1, though other iterations for period lengths may be included in this analysis even though they are not shown in the exemplary figure.

The second part of this step is to determine, for each of these options, what the total number of control locations available would be for each option. This can be done by counting the number of potential control locations on that sequence that have pre period and post period lengths that are greater than or equal to the lengths for that option. For example, potential control Store C could not be included in the last option above because its post period is not long enough (1 week instead of the required 2). The result on our sample data for potential experiment 1 is shown in FIG. 14. As shown, for each pre period and post period length, it is determined how many control locations satisfy the pre and post period length criteria.

The last step is to select one of the options based on the following optimization: maximize the length of the experiment subject to an optional user-defined constraint on a minimum number of control stores. The length of the experiment is defined as the sum of the pre and post period lengths. In the case of a tie, the option with the maximum post period length is given preference.

For example, a minimum number of control stores is set to 3 stores by the user. In that case, there are three options for potential experiment 1: pre period and post period lengths of [(2,1);(2,2);(3,1)]. Further, two of these options are tied for the largest overall length at 4 periods. Because the (2,2) option has a longer post period, it is selected as the optimal experiment length.

Based on the length of each experiment selected, the experiments are saved in their final form. This consists of two results tables: one defining each experiment and test location as shown in FIG. 15, and the other listing all control locations associated with the experiment as shown in FIG. 16. The control locations are all stores that have pre period and post period lengths that are greater than or equal to the selected length option.

In this example, all potential experiments ended up as final experiments, but this is not necessarily always the case. Potential experiments can drop out due to restrictions on pre period and post period lengths or because there are not enough control stores.

The results can be output from the system to the user. For example, a table or report can be presented to the user on a graphical user interface. The table can display a list of each of the natural experiments that were identified in the scanned dataset. This list can include meta-data about each experiment including, for example, when it occurred, how many test and control locations were involved, how long the change was sustained, the size of the change, and the degree of similarity between test and control locations. The size of the change can be the difference between the test group and control group, or can include the change in test group value before the experiment date as compared to after the experiment date.

The degree of similarity between the test and control locations can consider a bias between the test entities and the control entities. It is most desirable to minimize or eliminate the bias between the test and control groups. So the output may provide a list of facts that could be a basis for bias between the test and control groups, which may provide differences between these groups. The list can also include a degree of measurement (e.g., a score) along with an attribute, characteristic, demographic, geographic region, population density, average income, etc. When selecting test entities and control entities from a large set, there may be differences between the entities, but it is desirable that these differences appear random rather than a consistent difference between the two groups. For example, if all of the test and control entities (e.g., stores) are within one state, then a list of one or more attributes or demographics may be listed where there is some bias (e.g., a higher population, median income). In another example, if all test stores are in Indiana, but all control stores are in California, then the experiment might be biased due to some legislation or other factors that could interfere with the results. If the attributes are different between the test and control entities, then there may be some bias and the results may not be used as a worthwhile experiment. In one example, if all test sites are in urban locations and all control sites are in rural locations, then the results may not be considered valid. In one embodiment, the data can be adjusted to account for bias when filtering or optimizing the data by eliminating those experiments where the entities show a strong bias, or by eliminating individual test or control entities from an experiment to reduce bias.

The size of the change in an experiment list can be calculated as the test versus control difference. It can be determined by calculating the test value in a post period (after the experiment) minus the test value in a pre period (before the experiment), and that value is subtracted from the difference in the control value in the post period minus the control value in the pre period. For example, if the test group price increased from 10 cents to 20 cents while control remained unchanged, then there was a 10 cent change. A user may desire to only want experiments that have changes greater than 10 cents.

When the user is presented with a list of experiments, the user can also review how the data was distributed. If no experiments were found and presented in the list, then user has an option to change any metrics, attributes, or other settings to reconfigure the analysis.

From the experiment list, users can select a subset (or all) of the experiments found in the dataset and easily transfer the test locations, control locations, and experiment dates into a best practice test versus control analytic engine to assess the net attributable impact of the change (e.g., in price) on key performance indicators (e.g., profit).

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer implemented method comprising:
   storing, by a computer, a set of historical data for a metric for a plurality of locations in a database;
   receiving, by the computer, a selection of a metric and an experiment change threshold for the metric;
   transmitting, by the computer, an instruction to a second computer requesting the second computer to identify at least one control location and at least one potential experiment in the set of historical data, based on the metric and the experiment change threshold for the metric;
   iteratively scanning, by the second computer, the set of historical data in the database to detect at least one potential experiment, wherein the computer, during each iterative scan, dynamically adjusts and automatically selects date ranges within a time frame, and dynamically detects a potential experiment where within a date range within the time frame, a test location has a value of the metric at a first date and a change in the metric beyond the experiment change threshold for the metric on two consecutive dates after the first date, wherein the date range is adjusted, by the computer, with each iteration based on a noise level associated with the value of the metric within the date range;

calculating, by the second computer, an experiment extension threshold based on the date range of the at least one potential experiment and the experiment change threshold for the metric;

determining, by the computer, a pre period and a post period for the at least one potential experiment based on the date range of the at least one potential experiment and the calculated experiment extension threshold and deriving a length of the at least one potential experiment for each test location based on the date range and the pre period and the post period for the at least one potential experiment;

identifying, by the second computer, a set of control locations for the at least one potential experiment;

continually optimizing, by the second computer, the set of control locations by:
  determining, by the second computer, a bias score for each control location, wherein the bias score is a measure of differences of a plurality of bias factors corresponding to each control location within the set of control locations;
  dynamically adjusting the historical data by eliminating, by the second computer in each iteration, one or more particular control locations from the set of control locations upon detecting a bias score for the one or more particular control locations exceeding a bias threshold, whereby the historical data is rescanned until an unbiased set of control locations has been achieved;

automatically selecting, by the second computer, at least one potential control location from the unbiased set of control locations as control locations for the at least one potential experiment by determining which of the at least one potential control locations has a value for the metric that does not exceed the experiment extension threshold during the length of the potential experiment, wherein the potential experiment is identified within the historical data and defined by the test location having the first value of the metric at the first date and a change in the metric beyond a predetermined threshold on two consecutive dates after the first date while a control location remains substantially constant at the first date and the two consecutive dates;

continually optimizing, by the second computer, a list of experiments based upon the at least one potential experiment that have a set of control locations greater than or equal to the length of the potential experiment and at least a predetermined number of control location for each experiment;

presenting, by the second computer, the list of experiments, the set of control locations and their corresponding bias scores, and the plurality of bias factors on a user interface of the computer; and receiving a selection of a subset of the experiments and calculating, by the second computer, a net attributable impact of the selected metric on a selected key performance indicator.

2. The method according to claim 1, further comprising normalizing, by the second computer, the set of historical data.

3. The method according to claim 1, further comprising, adjusting, by the second computer, the historical data to use date sequences numbers instead of calendar dates.

4. The method according to claim 1, wherein identifying, by the second computer, potential control locations for the set of potential experiment dates further comprises identifying all locations having a value of the metric remaining constant over a sequence preceding the potential experiment.

5. The method according to claim 1, wherein determining, by the second computer, a maximum length of the experiment for each potential control location and date further comprises determining how long into a pre period and a post period each of the potential control locations are eligible as control locations.

6. The method according to claim 1, wherein the two consecutive dates are two consecutive days, two consecutive weeks, two consecutive months, or two consecutive years.

7. The method according to claim 1, further comprising determining, by the second computer, a minimum number of control locations for the experiment, wherein the generated list of experiments has at least the minimum number of control locations.

8. The method according to claim 1, wherein determining, by the second computer, how many potential control locations qualify as a control locations based upon the length of the potential experiment comprises determining whether the length of the pre period and the length of the post period for each control location is greater than or equal to the length of the pre period and the length of the post period of the test location in the potential experiment.

9. The method according to claim 1, wherein the experiment extension threshold represents a maximum change allowed in the metric in the pre period of the post period.

10. The method according to claim 1, further comprising receiving, by the second computer, a minimum pre period length or a minimum post period length that is required to qualify as the experiment.

11. The method according to claim 1, further comprising receiving, by the second computer, a maximum control change threshold that represents a maximum change in the metric to qualify as a control candidate.

12. The method according to claim 1, further comprising, determining, by the second computer, a maximum length for the experiment.

13. A computer-implemented method comprising:
  receiving, by a computer, a selection of a metric and an experiment change threshold for the metric;
  iteratively scanning, by the computer, a set of historical data in a database to identify a set of test candidates based on changes in a value of a metric at a predetermined frequency, wherein the difference between a pre-period value and a post period value of the metric is above the experiment change threshold value;
  calculating, by the computer, an experiment extension threshold based on a date range from the pre period to the post period and the experiment change threshold value;
  iteratively scanning, by the computer, the set of historical data in the database to identify a set of control candidates for each test candidate where the change between the pre period value and a post period value of the metric does not exceed the experiment extension threshold, wherein the experiment is dynamically detected with the set of historical data and defined by the test candidate having a first value of the metric at the first date and a change in the metric beyond the experiment change threshold on two consecutive dates after the first date while the change for the metric for a control candidate does not exceed the experiment extension threshold at the first date and the two consecutive dates;

continually optimizing a set of control locations by:
determining, by the computer, a bias score for each control candidates, wherein the bias score is a measure of differences of a plurality of bias factors corresponding to each control candidate within the set of control candidates; and
upon detecting a bias score for a particular control candidate exceeding a threshold, eliminating, by the computer, the particular control candidate from the set of control locations;

determining, by the computer, a minimum number of control candidates for each test candidate;
scanning, by the computer, the set of historical data in the database to identify an experiment where a test candidate has a number of control candidates that is the same or greater than the minimum number of control candidates;
presenting, by the computer, a report of the identified experiment to a user interface of a user computing device; and
receiving a selection of the identified experiment and calculating, by the computer, a net attributable impact of the selected metric on a selected key performance indicator.

14. The method according to claim 13, wherein the frequency is selected from the group consisting of daily, weekly, monthly, or annually.

15. The method according to claim 13, wherein the experiment extension threshold represents a maximum change allowed in the metric in the pre period or the post period.

16. The method according to claim 13, further comprising receiving, by the computer, a minimum pre period length or a minimum post period length that is required to qualify as the experiment.

17. The method according to claim 13, further comprising receiving, by the computer, a maximum control change threshold that represents a maximum change in the metric to qualify as a control candidate.

18. The method according to claim 13, further comprising, determining, by the computer, a maximum length for the experiment.

19. A computer-implemented method comprising:
receiving, by a computer, from a first user interface rendered on a first webpage of a web browser displayed on a user computing device, a selection of a metric for a set of historical data from a database;
receiving, by the computer from the first user interface of the user computing device, an input of a experiment change threshold for a change in the metric, wherein a candidate test location has a change in the matric greater than the experiment change threshold for consecutive dates;
iteratively scanning, by the computer, the set of historical data in the database to automatically generate a set of all candidate experiments where the metric for a test location changes by an amount greater than the experiment change threshold on two consecutive dates;
during each iterative scan, dynamically adjusting and automatically selecting, by the computer, a pre-period length and a post period length for each candidate test location;
iteratively scanning, by the computer, the set of historical data in the database to identify a set of potential control location for the list of all candidate test locations;
automatically selecting, by the computer, a pre period length and a post period length for each potential control location;
automatically selecting, by the computer, an optimal length of an experiment based upon the pre period length and post period length of each candidate test location and the pre period and post period length of each potential control location;
calculating, by the computer, an experiment extension threshold based on the optimal length and the experiment change threshold;
automatically selecting, by the computer, a minimum number of control locations for the optimal length of the experiment;
automatically generating, by the computer, a set of experiments from the set of candidate experiments where the test location has at least the minimum number of control locations, wherein each experiment in the set of experiments is dynamically detected within the set of historical data and defined by the candidate test location having a first value of the metric at the first date and a change in the metric beyond the experiment change threshold on two consecutive dates after the first date while a change in the value for the metric of a control location does not exceed the experiment extension threshold from the first date to the two consecutive dates;
presenting, by the computer, the set of experiments on a user interface of the user computing device for selection of an experiment from the set of experiments on a second user interface rendered on a second webpage of the web browser displayed on the user computing device, wherein the second user interface displays an indicator associated with each value of the metric, where the indicator comprises a color associated with a range corresponding to each value of the metric; and
receiving, by the computer, a selection of a metric and a subset of the set of experiments and calculating, using the subset of the set of experiments to assess a net attributable impact of the selected metric on a key performance indicator.

20. The method according to claim 19, wherein the experiment extension threshold represents a maximum change allowed in the metric in the pre period or the post period.

21. The method according to claim 19, further comprising receiving, by the computer, a minimum pre period length or a minimum post period length that is required to qualify as a candidate experiment.

22. The method according to claim 19, further comprising receiving, by the computer, a maximum control change threshold that represents a maximum change in a metric to qualify as a control location.

23. The method according to claim 19, further comprising, determining, by the computer, a maximum length for the candidate experiment.

* * * * *